(12) United States Patent
Shiraki et al.

(10) Patent No.: US 7,069,353 B2
(45) Date of Patent: Jun. 27, 2006

(54) COMMAND MULTIPLEX NUMBER MONITORING CONTROL SCHEME AND COMPUTER SYSTEM USING THE COMMAND MULTIPLEX NUMBER MONITORING CONTROL SCHEME

(75) Inventors: Shinjiro Shiraki, Ninomiya (JP); Koji Nagata, Kaisei (JP)

(73) Assignee: Hitachi, Ltd., Tokyo (JP)

( * ) Notice: Subject to any disclaimer, the term of this patent is extended or adjusted under 35 U.S.C. 154(b) by 114 days.

(21) Appl. No.: 10/866,674

(22) Filed: Jun. 15, 2004

(65) Prior Publication Data

US 2005/0223138 A1    Oct. 6, 2005

(30) Foreign Application Priority Data

Apr. 5, 2004  (JP) .............................. 2004-111188
May 12, 2004 (JP) .............................. 2004-142648

(51) Int. Cl.
*G06F 3/00* (2006.01)
*G06F 15/16* (2006.01)

(52) U.S. Cl. .............................. 710/36; 710/5; 709/217
(58) Field of Classification Search .................... 710/5, 710/36; 709/217

See application file for complete search history.

(56) References Cited

U.S. PATENT DOCUMENTS

| | | | |
|---|---|---|---|
| 6,523,096 B1 | 2/2003 | Sanada et al. | |
| 6,609,180 B1 | 8/2003 | Sanada et al. | |
| 6,622,163 B1 | 9/2003 | Tawill et al. | |
| 6,715,031 B1 | 3/2004 | Camble et al. | |
| 6,728,844 B1 | 4/2004 | Sanada et al. | |
| 2001/0008010 A1 | 7/2001 | Sanada et al. | |
| 2001/0009024 A1 | 7/2001 | Sanada et al. | |
| 2001/0011332 A1 | 8/2001 | Sanada et al. | |
| 2001/0047463 A1 | 11/2001 | Kamano et al. | |
| 2003/0196055 A1* | 10/2003 | Kamano et al. | 711/163 |
| 2003/0200399 A1 | 10/2003 | Dawkins et al. | |
| 2004/0006604 A1* | 1/2004 | Kawashima et al. | 709/213 |
| 2004/0049564 A1* | 3/2004 | Ng et al. | 709/223 |

* cited by examiner

*Primary Examiner*—Kim Huynh
*Assistant Examiner*—Eron Sorrell
(74) *Attorney, Agent, or Firm*—Reed Smith LLP; Stanley P. Fisher, Esq.; Juan Carlos A. Marquez, Esq.

(57) ABSTRACT

There is provided a command multiplex number monitoring control scheme capable of avoiding issue of a QF status and getting rid of system performance degradation without adding command processing resources. Command issue multiplex numbers CMs (32, 16 and 8) for WWN1-LU2, WWN2-LU1 and WWN3-LU0 are set in a port PT1 so as to be associated with the host bus adaptors HBAs in higher rank apparatuses HOST-1, HOST-2 and HOST-3. Denoting the sum total of command issue multiplex numbers CMs for respective set access permissions by (C), an access permission satisfying the relationship represented as "command processing multiplex limit number (B)≧the sum total (C) of command issue multiplex numbers CMs for respective access permissions" is not permitted. Thus, the command issue multiplex numbers of the connected higher rank apparatuses are monitored.

2 Claims, 12 Drawing Sheets

| E.No | AAHBA-WWN | WA-LU.No | MCN |
|---|---|---|---|
| 0 | WWN 1 | 2 | 32 |
| 1 | WWN 2 | 1 | 16 |
| 2 | WWN 3 | 0 | 8 |

FIG.3

| E.No | AAHBA-WWN | WA-LU.No | PMCN |
|---|---|---|---|
| 0 | WWN 1 | 2 | 60 (%) |
| 1 | WWN 2 | 1 | 30 (%) |
| 2 | WWN 3 | 0 | 10 (%) |

COMMAND MULTIPLEX NUMBER MONITORING CONTROL SCHEME AND COMPUTER SYSTEM USING THE COMMAND MULTIPLEX NUMBER MONITORING CONTROL SCHEME

INCORPORATION BY REFERENCE

The present application claims priorities from Japanese applications JP2004-111188 filed on Apr. 5, 2004, JP2004-142648 filed on May 12, 2004, the contents of which are hereby incorporated by reference into this application.

BACKGROUND OF THE INVENTION

The present invention relates to a command multiplex number monitoring control scheme in an information processing system including a plurality of higher rank apparatuses and a storage apparatus connected via a network, and a computer system using this command multiplex number monitoring control scheme.

A storage apparatus connected to one or more higher rank apparatuses (hosts) via a storage area network (SAN) such as a fiber channel (FC) includes storage means (which is referred to as volume, and which typically includes a disk apparatus) having one or more logical units (LU) and a storage control apparatus for controlling the storage means. The storage control apparatus exercises control for permitting a command from a higher rank apparatus to access some of logical units included in the storage apparatus. The storage control apparatus includes one or more ports. A plurality of higher rank apparatuses are connected to one port via a network, and multiplex command processing is made possible.

In such connection, it is necessary to permit only a specific higher rank apparatus to access a specific logical unit included in the storage means. Each of the higher rank apparatuses has a world wide name (WWN) serving as an identifier. And for the purpose of access permission decision control, the world wide names (WWN) each of which is an identifier of the higher rank apparatuses and information concerning logical units by which the higher rank apparatuses are permitted to be accessed are set in the storage control apparatus. Hereafter, a higher rank apparatus having a WWN is also referred to simply as WWN in some cases.

A technique belonging to conventional techniques of this kind and having a function of preventing illegal access from higher rank apparatuses in an environment in which it is possible to physically accept access from all higher rank apparatuses is disclosed in JP-A-10-333839.

In such a computer system in which one or more higher rank apparatuses are connected to a storage apparatus via a network such as a SAN, a command issue multiplex number is set for each higher rank apparatus so as not to exceed a multiplex limit number of command processing in the storage control apparatus included in the storage apparatus. If the storage control apparatus receives commands exceeding a command processing multiplex limit number, then the storage control apparatus reports a status to the effect that the number of accepted commands (the number of queues) is full (hereafter referred to also as command full or queue full (QF)) to the higher rank apparatuses. Upon receiving the QF status, the higher rank apparatuses stop command multiplex issue, so that unexpected performance degradation is caused. For example, condition in which multiple processing of commands is not executed continues. In the configuration of the conventional computer system of this kind, there is nothing for avoiding such unexpected performance degradation but to add sufficient command processing resources.

SUMMARY OF THE INVENTION

An object of the present invention is to provide a command multiplex number monitoring control scheme capable of avoiding issue of the QF status and getting rid of system performance degradation without adding command processing resources, and a computer system using this command multiplex number monitoring control scheme.

In order to achieve the object, the present invention provides a control scheme for monitoring so as to prevent the sum total of the command multiplex numbers set in the connected higher rank apparatuses from exceeding the command multiplex processing capability of the storage control apparatus. In this control scheme, the following operations can be conducted.

(1) Command issue multiplex numbers set in the higher rank apparatuses for respective paths of WWN (world wide name)—LU (logical unit) are set in the storage apparatus as well, and an access permission for which the sum total of the set numbers exceeds a command processing multiplex limit number is not set.

(2) A "reference instruction" whereby the command issue multiplex numbers set in the storage apparatus can be referenced from the higher rank apparatuses is provided.

(3) The command issue multiplex numbers are referenced from a path management program incorporated in each of the higher rank apparatuses, and values of the command issue multiplex numbers are referenced from the storage apparatus.

(4) A command processing multiplex number that determines priority of command processing can be set in the storage apparatus for each WWN-LU. A QF status notifying that queues are full is reported against a command received in excess of a value set for each WWN-LU. In this case, when command issue multiplex numbers set for each WWN (world wide neme)—LU(logical unit) are set to the storage apparatus, a check against the command processing multiplex limit number is not conducted.

(5) A command multiplex situation received for each WWN-LU is monitored. If a command exceeding the assigned priority is received and command processing is not present in other WWN-LUs, command resources are assigned to the WWN-LU under operation.

According to the present invention, the following advantages are obtained.

(1) Connections to higher rank apparatuses exceeding the command processing multiplex limit number in the storage apparatus can be prevented.

(2) Command issue multiplex numbers of the higher rank apparatuses managed in the storage apparatus can be correctly set in the higher rank apparatuses.

(3) Command issue multiplex numbers set in the higher rank apparatuses can be correctly set in the storage apparatus.

(4) When the storage apparatus is connected to a higher rank apparatus that does not stop command multiplex issue even if the higher rank apparatus has received a QF status, it becomes possible to provide priority for each world wide name WWN—logical unit LU. When setting access permissions that are not used at the same time, command processing resources can be utilized efficiently.

(5) A command for WWN—LU under operation can be processed preferentially according to the operational situation of the higher rank apparatuses connected to the storage apparatus and in excess of the set priority.

Other objects, features and advantages of the invention will become apparent from the following description of the embodiments of the invention taken in conjunction with the accompanying drawings.

DETAILED DESCRIPTION OF THE EMBODIMENTS

Hereafter, embodiments of the present invention will be described in detail with reference to the drawings.

Figure 1:
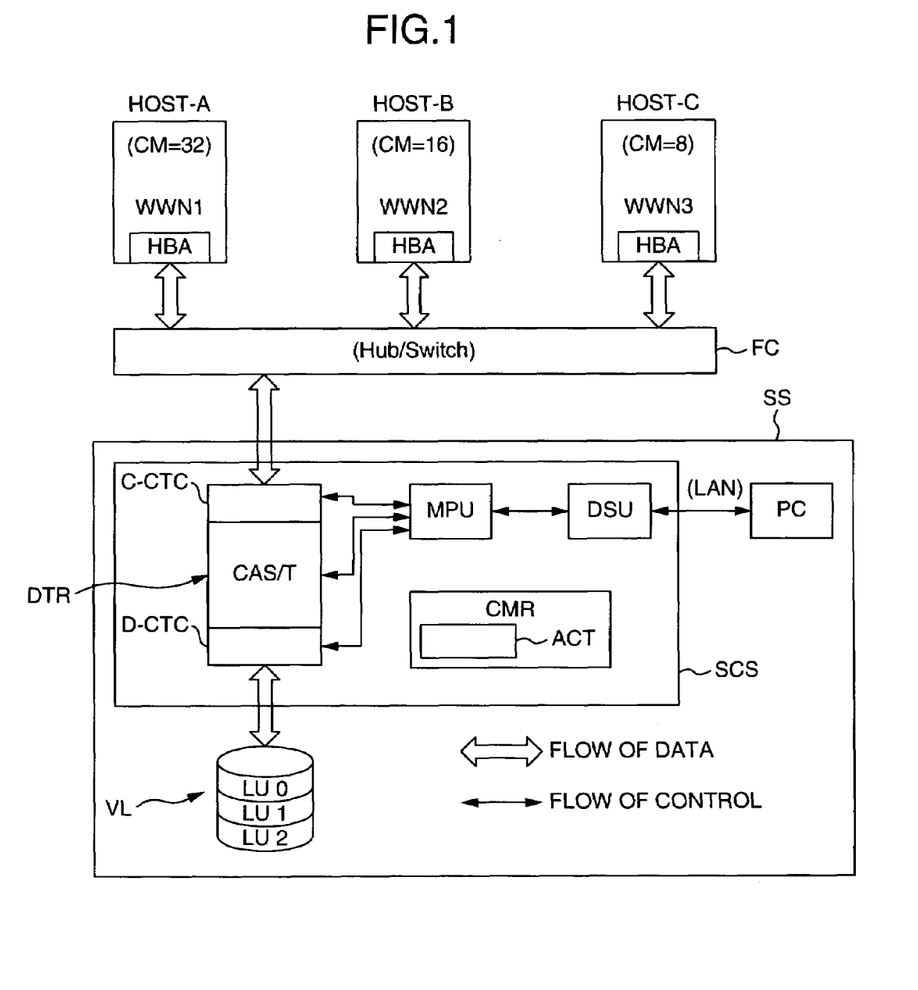
FIG. 1 is a diagram showing a general configuration of a computer system according to the present invention.

FIG. 1 is a diagram showing a general configuration of a computer system according to the present invention. In FIG. 1, a plurality of higher rank apparatuses HOST-A, HOST-B and HOST-C are connected to a storage apparatus SS via a fiber channel FC. The higher rank apparatuses are connected to the storage apparatus directly or via a network device such as a switch.

The higher rank apparatuses HOST-A, HOST-B and HOST-C have world wide names WWN1, WWN2 and WWN3, respectively. A command multiplex number CM is set in each of the higher rank apparatuses HOST-A, HOST-B and HOST-C. In the example shown in FIG. 1, CM=32 is set in the higher rank apparatus HOST-A, and CM=16 is set in the higher rank apparatus HOST-B. CM=8 is set in the higher rank apparatus HOST-C. Each of the higher rank apparatuses has a host bus adapter HBA serving as an interface to a fiber channel (FC).

The storage apparatus SS includes a volume VL and a storage control apparatus SCS for controlling the volume VL. Here, the volume VL is a disk apparatus. However, the volume VL is not limited to a disk apparatus. The volume VL includes a plurality of logical units LU0, LU1, LU2 . . . . .

The storage control apparatus SCS for controlling the volume VL includes a transfer unit DTR, a control memory CMR, and an information setting apparatus DSU. The transfer unit DTR includes a channel side transfer control unit C-CTC, a transfer control unit CAS/T having a cache memory, and a device side transfer control unit D-CTC. The control memory CMR includes an access permission information management table ACT. And the storage control apparatus SCS includes a microprocessor MPU for controlling those components. A personal computer PC is provided to input setting information to the information setting apparatus DSU. Alternatively, it is possible to provide an operation panel instead of the personal computer PC and input setting information from the operation panel.

Although each of the channel side transfer control unit C-CTC and the device side transfer control unit D-CTC has a port, illustration is omitted. Data based on a write command issued by a higher rank apparatus is stored in the cache memory in the transfer control unit CAS/T, and at this point in time the higher rank apparatus is notified of completion of the command processing. Thereafter, writing into a predetermined logical unit among the logical units LU0, LU1 and LU2 included in the volume VL is conducted via the device side transfer control unit D-CTC.

A command (such as a write command or read command) issued by the higher rank apparatus HOST-A, HOST-B or HOST-C is received by the storage control apparatus SCS via the fiber channel CF. The storage control apparatus SCS conducts processing on the received command, and sends a result of processing to the higher rank apparatus as a response. If the command issue and the processing result response are conducted sequentially, an idle time having no commands to be processed by the storage control apparatus SCS occurs between the response of the processing result and issue of the next command. In order to make it possible to conduct processing on a command during the idle time as well, the higher rank apparatus issues the next command without waiting for a response of a processing result for a command already issued (multiplex issue).

The multiplex command issue conducted by the higher rank apparatus is limited to a range of the command multiplex number set in the higher rank apparatus. The higher rank apparatus does not issue commands in excess of the set command multiplex number.

On the other hand, the storage control apparatus SCS, which has received a command from the higher rank apparatus, has a plurality of management queues. The management queues are managed in the access permission information management table ACT in the control memory CMR. Upon receiving a command, the storage control apparatus SCS uses one of the management queues, sends a result of processing as a response after the processing is finished, and releases the used entry. Therefore, the number of the management queues becomes the multiplex capability of the storage control apparatus SCS.

If the storage control apparatus SCS receives more commands than the management queues in multiplex from a higher rank apparatus, then the storage control apparatus SCS sends a processing result of a QF status to the higher rank apparatus as a response in order to notify the higher rank apparatus that commands cannot be received.

Figure 2:
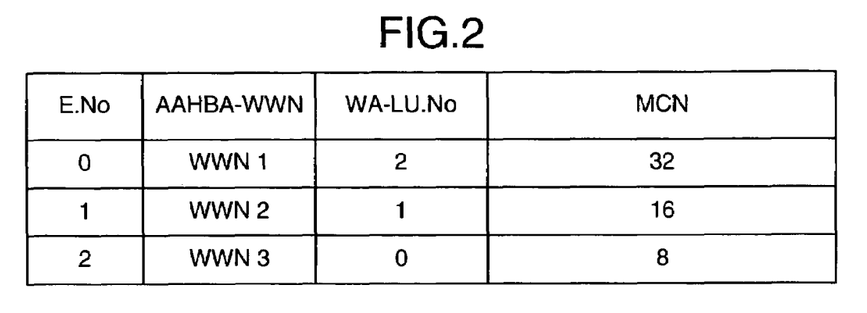
FIG. 2 is a diagram showing a higher rank apparatus command issue multiplex number management table stored in an access permission information management table shown in FIG. 1.

FIG. 2 is a diagram showing a higher rank apparatus command issue multiplex number management table stored in the access permission information management table ACT shown in FIG. 1. The access permission information management table ACT is prepared for each of ports included in the storage control apparatus SCS. A first column in the table ACT has a management queue entry number (E.No). A second column has a logical unit (LU) number permitted to be accessed WWN(AAHBA-WWN). A third column has a logical unit (LU) number a WWN is permitted to access (WA-LU.NO). A fourth column has a command multiplex number (MCN) for each of the WWN-LU paths set in the higher rank apparatuses. The multiplex command number for the WWN-LU paths is set equal to 32 for WWN1, 16 for WWN2, and 8 for WWN3.

The management information shown in FIG. 2 represents the following facts:

The logical unit LU2 can be accessed by only a higher rank apparatus having WWN1.

The logical unit LU1 can be accessed by only a higher rank apparatus having WWN2.

The logical unit LU0 can be accessed by only a higher rank apparatus having WWN3.

Figure 3:
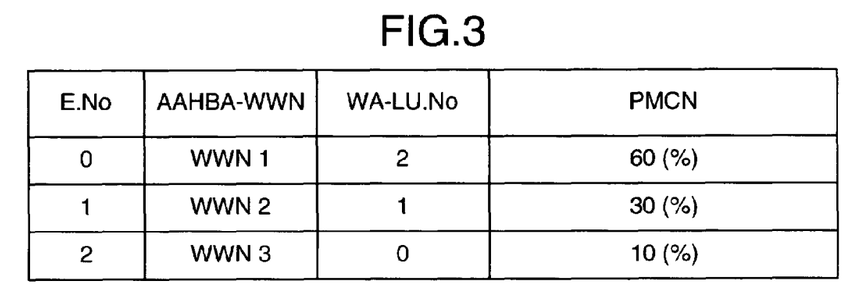
FIG. 3 is a diagram showing a priority determining command issue multiplex number management table stored in an access permission information management table shown in FIG. 1.

FIG. 3 is a diagram showing a priority determining command issue multiplex number management table stored in the access permission information management table shown in FIG. 1. This access permission information management table ACT is also prepared for each of ports included in the storage control apparatus SCS. As shown in its fourth column, the priority determining command multiplex number (PMCN) for each of the WWN-LU paths is stored. If the table shown in FIG. 2 and the table shown in FIG. 3 are integrated into one table, the fourth column shown in FIG. 3 corresponds to a fifth column that should follow the fourth column shown in FIG. 2. The priority determining command multiplex number for the WWN-LU paths is set equal to 60% for WWN1, 30% for WWN2, and 10% for WWN3.

FIRST EMBODIMENT

Figure 4:
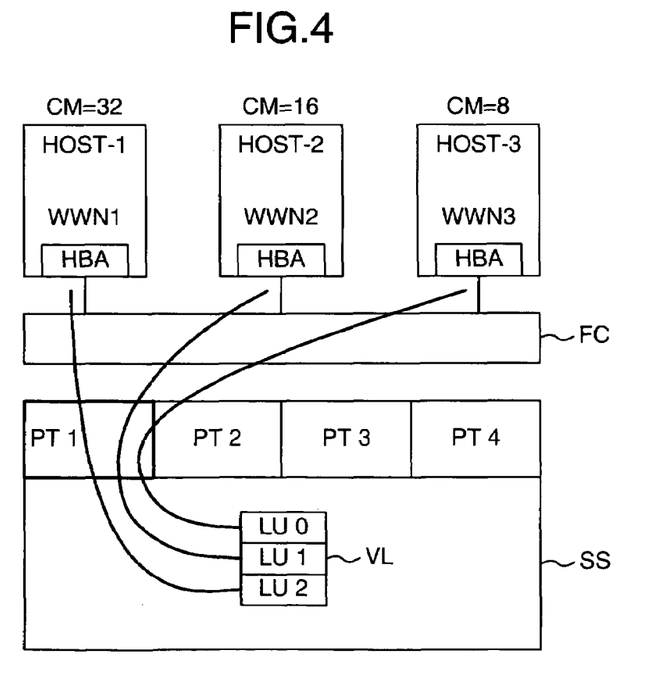
FIG. 4 is a diagram of a computer system showing a first problem to be solved by the present invention.

A first embodiment solves the following problem. FIG. 4 is a diagram of a computer system showing a first problem to be solved by the present invention. It is now supposed in FIG. 4 that three higher rank apparatuses HOST-1, HOST-2 and HOST-3 are connected to the storage apparatus SS via the fiber channel FC. It is supposed in FIG. 4 that the storage control apparatus includes four ports PT1, PT2, PT3 and PT4. Other components are not illustrated.

The higher rank apparatuses HOST-1, HOST-2 and HOST-3 are provided with, WWN1, WWN2 and WWN3, respectively. The command issue multiplex number CM is 32, 16 and 8, and the sum total (A) of the command issue multiplex numbers is 56.

It is now supposed that the multiplex limit number of command processing in the port PT1 is (B). If the higher rank apparatuses HOST-1, HOST-2 and HOST-3 access the logical units LU1, LU2 and LU3 in the volume VL and the relationship represented as "the sum total (A) of the command issue multiplex numbers $\leq$ the multiplex limit number of command processing (B)" becomes unsatisfied, then there is a possibility that the storage control apparatus will report the QF status to the higher rank apparatuses. Upon receiving the report of the QF status, the higher rank apparatuses stop the subsequent multiple of command issue. Even if the QF status is canceled, the multiple of command issue remains to be stopped. This is the first problem to be solved. The first embodiment solves the first problem.

Figure 5:
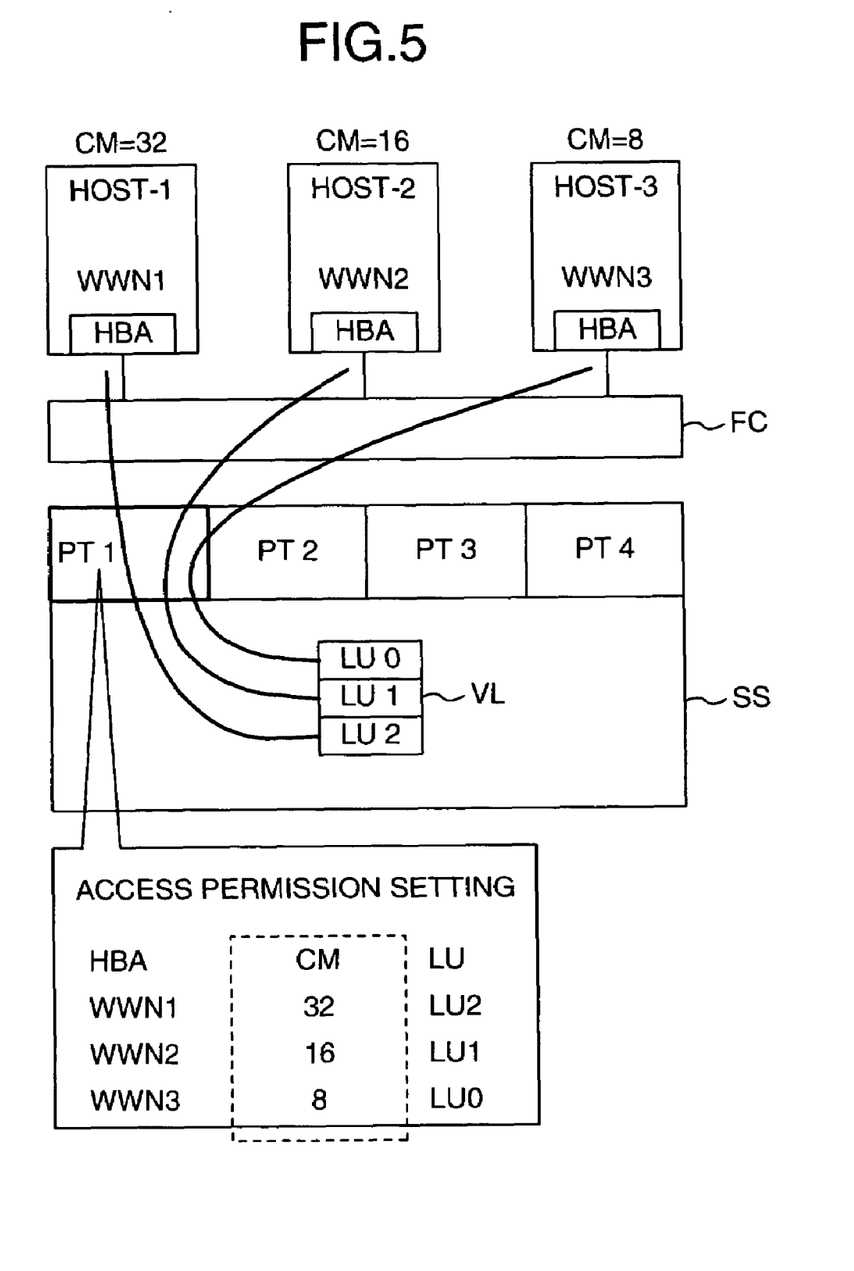
FIG. 5 is a diagram of a computer system showing a first embodiment of the present invention.

FIG. 5 is a diagram of a computer system showing the first embodiment of the present invention. In the first embodiment, the command issue multiplex number set in the higher rank apparatuses for each of the WWN-LUs is set in the storage apparatus as well together with "access permission." Setting of such "access permission" that the sum total of setting numbers exceeds the command processing multiplex limit number is not permitted.

In other words, in a configuration similar to that shown in FIG. 4, the command issue multiplex numbers CMs (32, 16 and 8) for WWN1-LU2, WWN2-LU1 and WWN3-LU0 corresponding to the host bus adaptors HBAs in the higher rank apparatuses are set in the port PT1. Similar setting is conducted with respect to the ports PT2 to PT4. It is supposed that the sum total of command issue multiplex numbers CMs for respective access permissions set in the port PT1 is (C). An access permission satisfying the relationship represented as "command processing multiplex limit number (B)$\geq$the sum total (C) of command issue multiplex numbers CMs for respective access permissions" is not permitted. Thus, the command issue multiplex numbers of the connected higher rank apparatuses are monitored.

Figure 6:
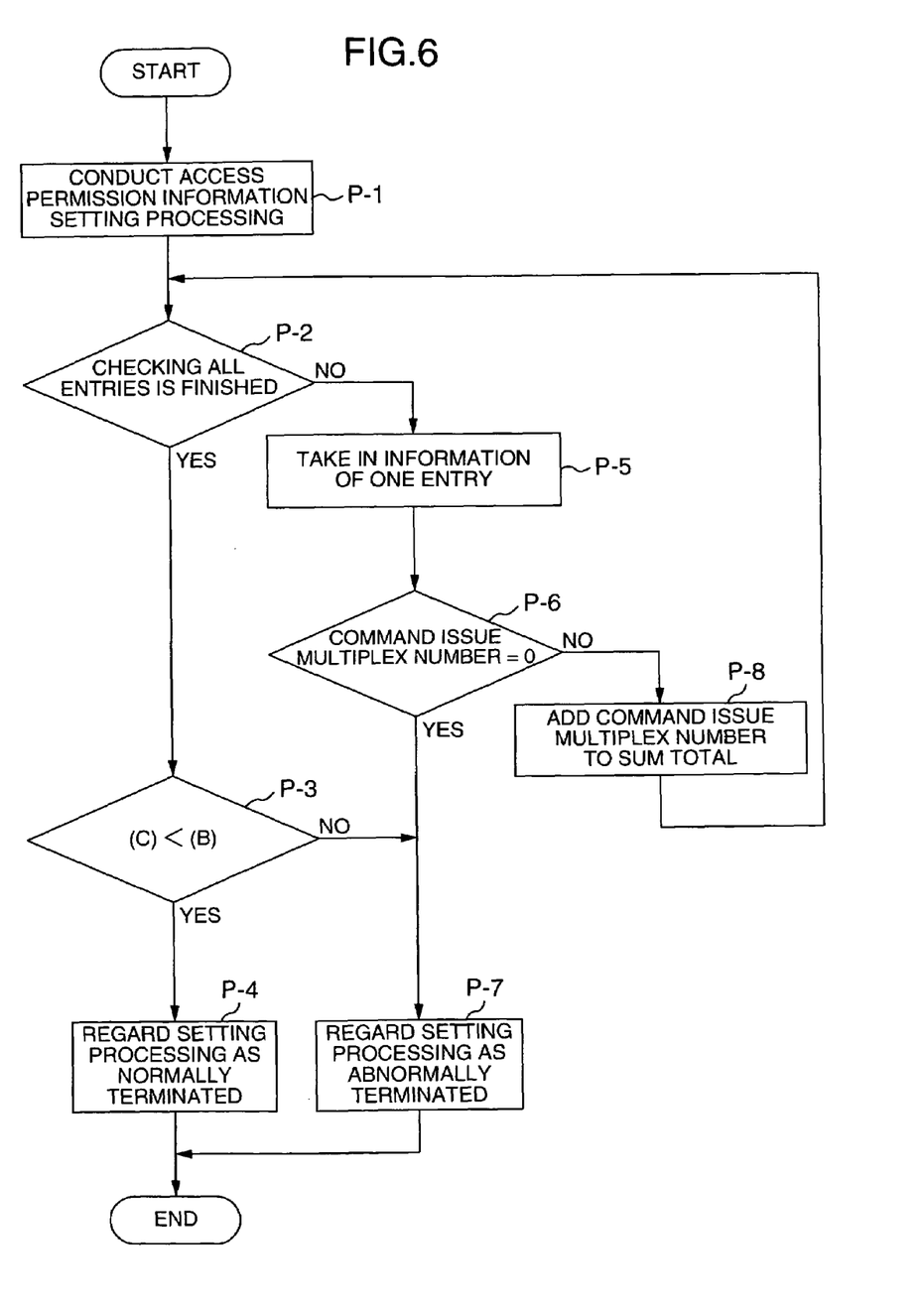
FIG. 6 is a flow diagram showing a processing procedure in a first embodiment of the present invention.

FIG. 6 is a flow diagram showing a processing procedure in the first embodiment of the present invention. This processing is processing for receiving an access permission information setting request from a utility program functioning on the information setting apparatus DSU or the information setting personal computer PC shown in FIG. 1. A microprogram in the storage control apparatus SCS executes the processing.

With reference to FIG. 6, processing is started, and access permission information setting processing is conducted (process-1, which is hereafter represented as P-1). It is determined whether checking of all entries has been finished (P-2). If checking of all entries has been finished, it is determined whether the relationship "the sum total (C) of command issue multiplex numbers CMs for respective access permissions$\leq$command processing multiplex limit number (B)" is satisfied (P-3). If the relationship "the sum total (C) of command issue multiplex numbers CMs for respective access permissions$\leq$command processing multiplex limit number (B)" is satisfied, then the setting processing is regarded as normally terminated (P-4), and the processing is finished. If the relationship "the sum total (C) of command issue multiplex numbers CMs for respective access permissions$\leq$command processing multiplex limit number (B)" is not satisfied at P-3, then the setting processing is regarded as abnormal (P-7), and the processing is finished.

If checking of all entries has not been finished at P-2, then information of one entry is taken in (P-5). It is determined whether the command issue multiplex number CM is 0 (P-6). If the command issue multiplex number CM is 0, then the processing proceeds to (P-7), and the processing is finished. If the command issue multiplex number CM is not 0, then the command issue multiplex number CM is added to the sum total (P-8), and the processing returns to (P-2).

According to the first embodiment conducting this processing, it is possible to prevent connections to higher rank apparatuses exceeding the command processing multiplex limit number in the storage apparatus.

SECOND EMBODIMENT

A second embodiment solves the following problem. When setting the command issue multiplex numbers in the higher rank apparatuses in FIG. 5, there is a possibility that values different from the command issue multiplex numbers set in the storage apparatus SS together with the access permission will be set. In other words, it is necessary to set the command issue multiplex numbers set in the storage apparatus SS together with the access permission, in the higher rank apparatuses without fail. The second embodiment solves this problem.

Figure 7:
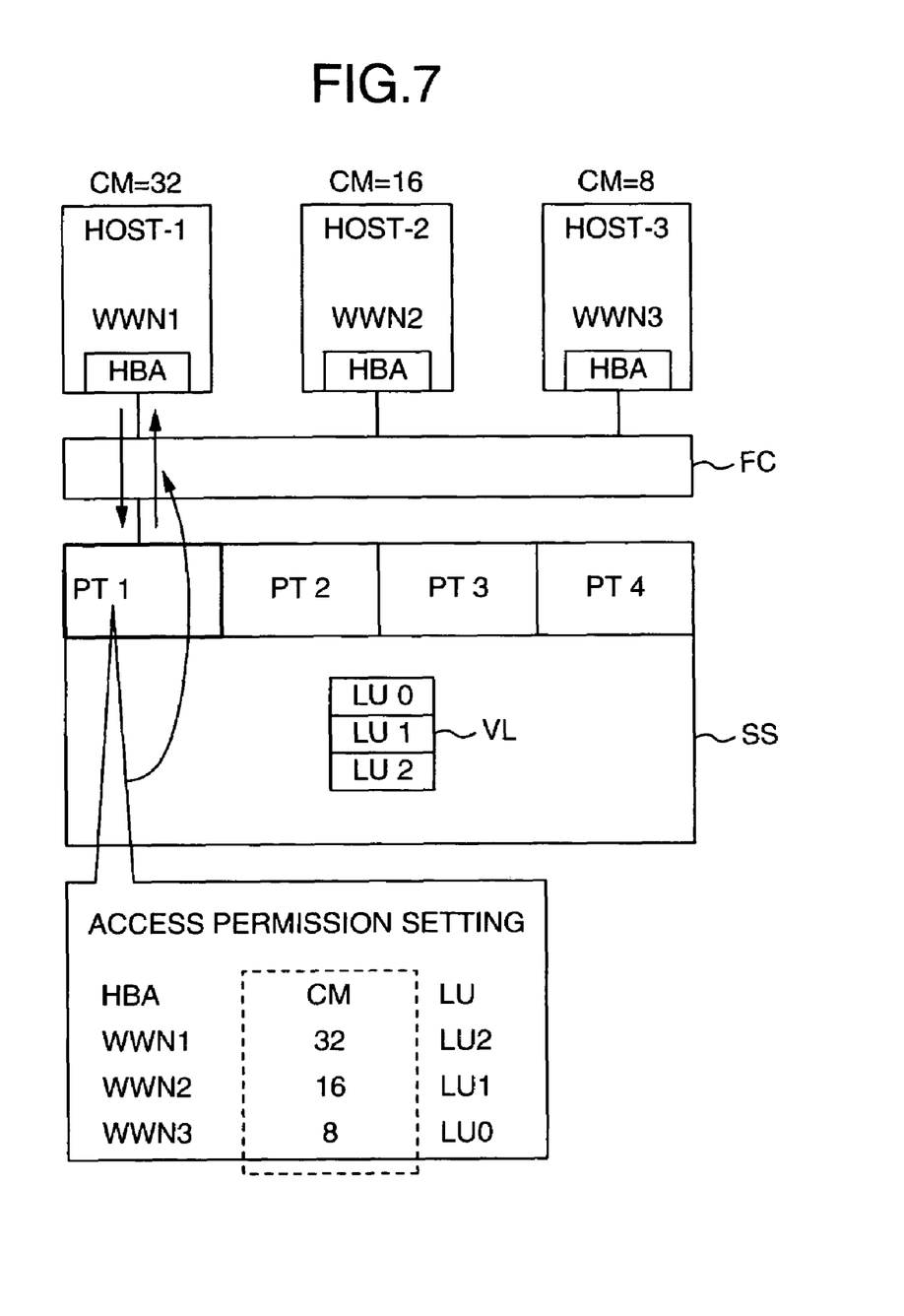
FIG. 7 is a diagram of a computer system showing a second embodiment of the present invention.

FIG. 7 is a diagram of a computer system showing the second embodiment of the present invention. In the second embodiment, a reference instruction is used to be able to refer to the command issue multiplex number set in the storage apparatus from the higher rank apparatuses. As shown in arrows in FIG. 7, in response to a reference instruction (set value read instruction) from a higher rank apparatus, the storage apparatus SS, or the storage control apparatus SCS in the storage apparatus SS sends information of command issue multiplex numbers CMs for respective access permissions set in the port PT1.

Figure 8:
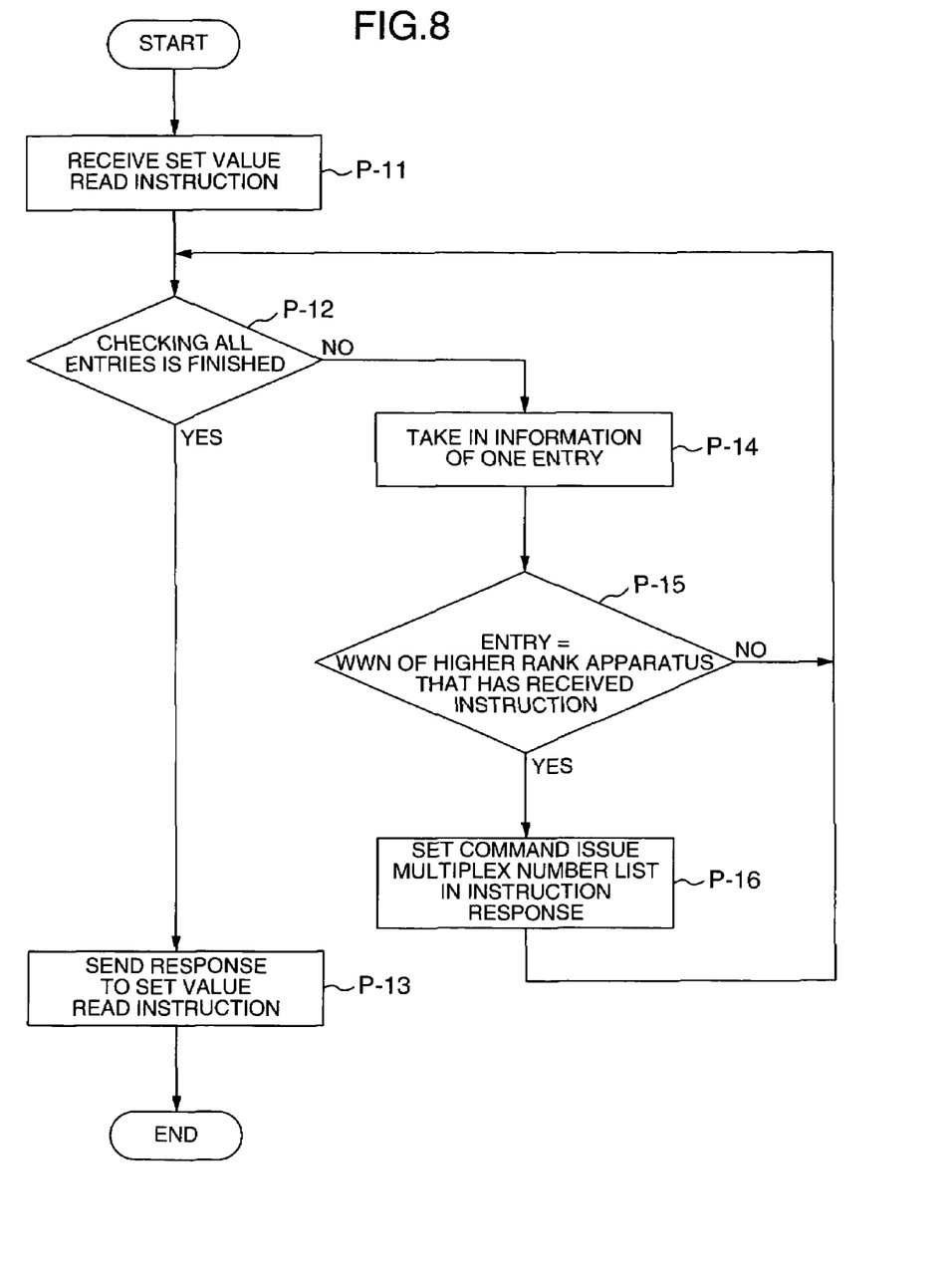
FIG. 8 is a flow diagram showing a processing procedure in a second embodiment of the present invention.

FIG. 8 is a flow diagram showing a processing procedure in the second embodiment of the present invention. This processing is processing for receiving an access permission information management table value reference instruction from a utility program functioning on the information setting apparatus DSU or the information setting personal computer PC shown in FIG. 1. A microprogram in the storage control apparatus SCS executes the processing.

Processing is started, and the storage control apparatus SCS receives the set value read instruction from a higher rank apparatus (P-11). It is determined whether checking of all entries has been finished (P-12). If checking of all entries has been finished, then the storage control apparatus SCS notifies the higher rank apparatus of the set values in response to the set value read instruction (P-13), and the processing is finished. If checking of all entries has not been finished at P-12, then the storage control apparatus SCS takes in information of one entry (P-14), and determines on the basis of the WWN whether the higher rank apparatus of that entry is the higher rank apparatus that has received the reference instruction (P-15).

If the higher rank apparatus of that entry is not the higher rank apparatus that has received the reference instruction, then the processing returns to P-12 as it is. If the higher rank apparatus of that entry is the higher rank apparatus that has received the reference instruction, then the storage control apparatus SCS sets a command issue multiplex number list in the instruction response (P-16), and the processing returns to P-12.

According to the second embodiment conducting this processing, it is possible to correctly set the command issue multiplex numbers of the higher rank apparatuses managed in the storage apparatus, in the higher rank apparatus.

THIRD EMBODIMENT

A third embodiment solves the following problem. When setting the command issue multiplex numbers in the storage apparatus SS shown in FIG. 5 together with access permission, there is a possibility that values different from the command issue multiplex numbers set in the higher rank apparatuses will be set. In other words, it is necessary to set the command issue multiplex numbers set in the higher rank apparatuses, in the storage apparatus together with the access permission without fail. The third embodiment solves this problem.

Figure 9:
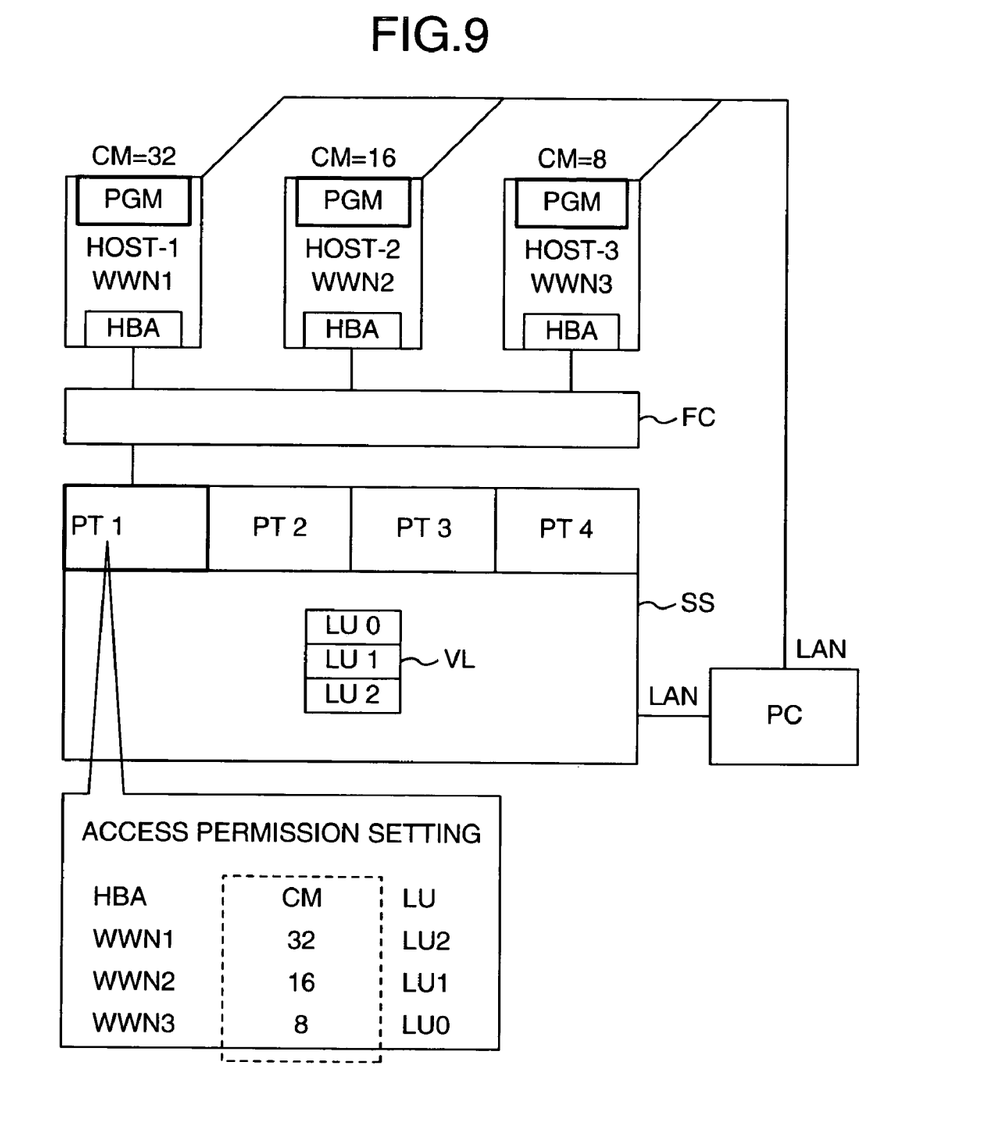
FIG. 9 is a diagram of a computer system showing a third embodiment of the present invention.

FIG. 9 is a diagram of a computer system showing the third embodiment of the present invention. In the third embodiment, a path management program incorporated in the higher rank apparatuses is referenced to find the command issue multiplex number, and the storage apparatus is referenced to find its value. A personal computer PC is connected to (a storage control apparatus SCS in) a storage apparatus SS and higher rank apparatuses HOST-1, HOST-2 and HOST-3 via a LAN. A path management program PGM is incorporated into each of the higher rank apparatuses HOST-1, HOST-2 and HOST-3. The personal computer PC sets the command multiplex number in a port PT1 on the basis of values set in the higher rank apparatuses and referenced via the path management program PGM.

According to the third embodiment, it is possible to correctly set command issue multiplex numbers set in the higher rank apparatuses, in the storage apparatus.

Figure 10:
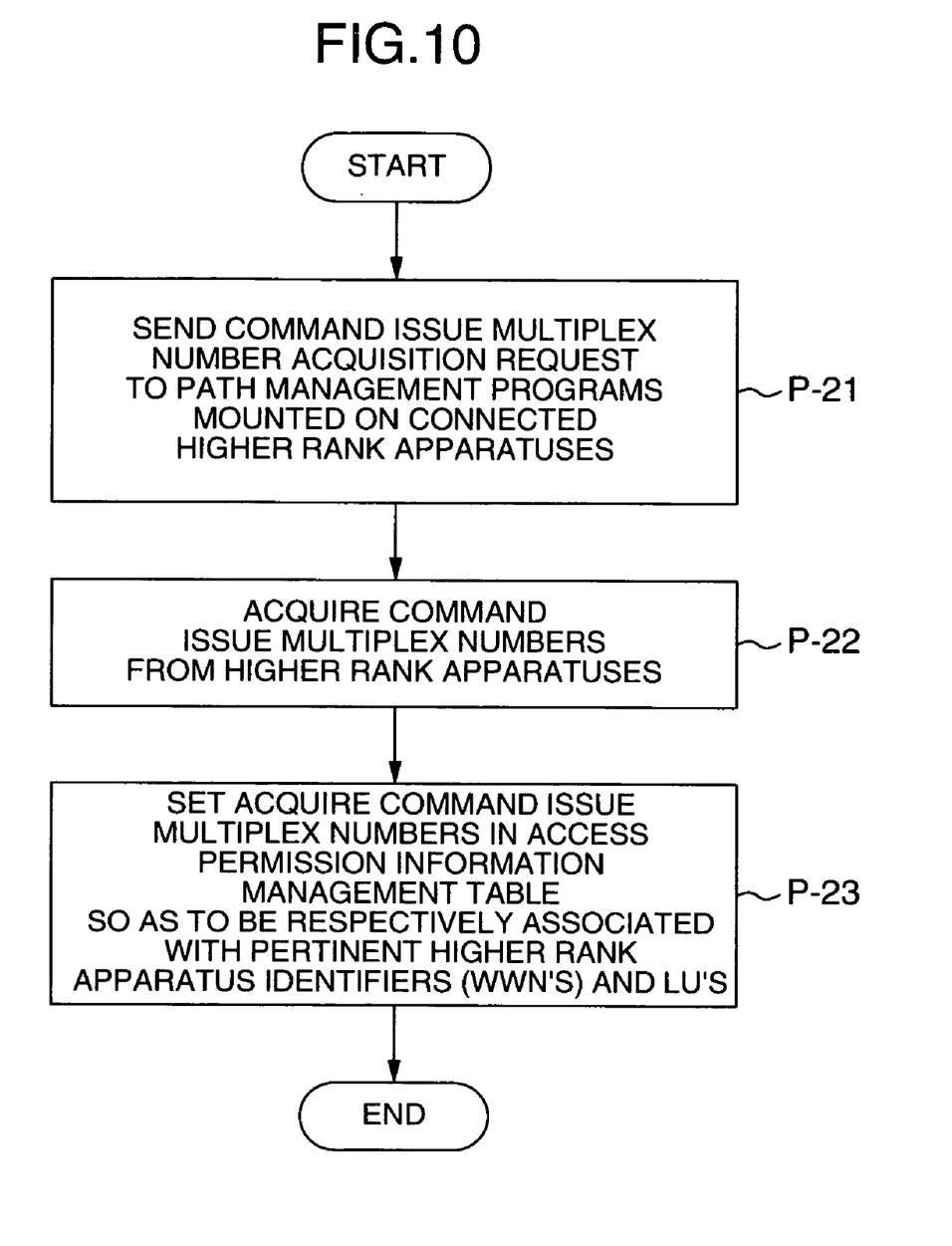
FIG. 10 is a flow diagram showing a processing procedure in a third embodiment of the present invention.

FIG. 10 is a flow diagram showing a processing procedure in the third embodiment of the present invention. This processing is processing for referring in the information setting personal computer PC to command issue multiplex numbers in the higher rank apparatuses and setting them in the access permission information management table ACT (FIGS. 1 to 3). When this information setting is started, the personal computer PC sends a command issue multiplex number acquisition request to the path management programs mounted on the connected higher rank apparatuses (P-21). The personal computer PC acquires the command issue multiplex numbers from the higher rank apparatuses (P-22), sets the acquired command issue multiplex numbers in the access permission information management table so as to be respectively associated with the identifiers (WWNs) of the pertinent higher rank apparatuses and logical units LUs (P-23), and terminates the processing.

According to the third embodiment, it is possible to correctly set the command issue multiplex numbers set in the higher rank apparatuses, in the storage apparatus.

FOURTH EMBODIMENT

Figure 11:
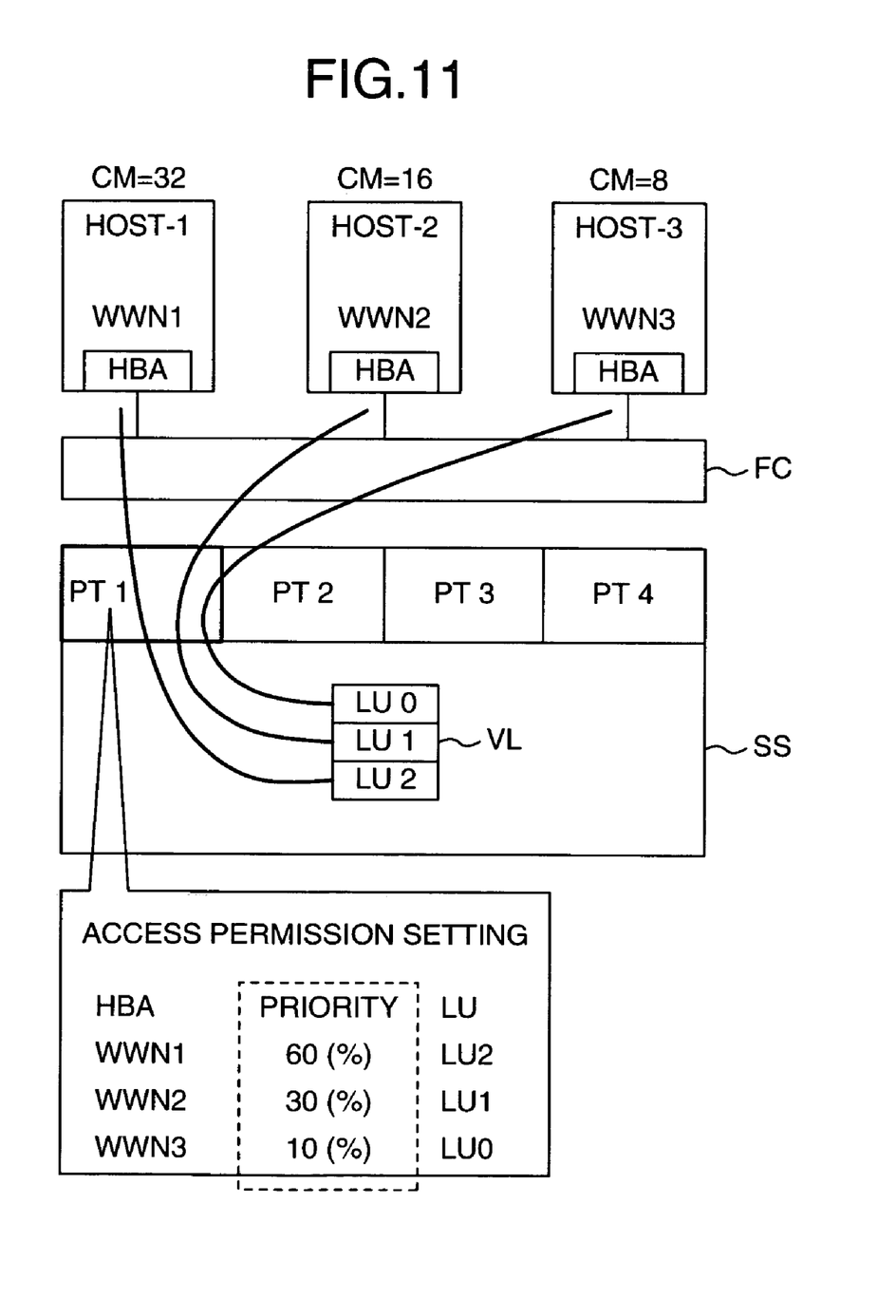
FIG. 11 is a diagram of a computer system showing a fourth embodiment of the present invention.

FIG. 11 is a diagram of a computer system showing a fourth embodiment of the present invention. The fourth embodiment solves the following problem. Priorities 60%, 30% and 10% are already set in ports PT1 to PT4 in a storage control apparatus in the storage apparatus SS so as to be respectively associated with world wide names WWN1 to WWN3, which are respectively identifiers of host bus adapters HBAs in the higher rank apparatuses. In FIG. 11, only priority setting in the port PT1 is illustrated. On the other hand, when a higher rank apparatus that does not stop command multiplex issue even if the higher rank apparatus has received a QF status is connected to the storage apparatus, priority cannot be set for each access permission.

Owing to the priority setting, it is not necessary to care about command multiplex issue stopping caused by QF status transmission. Therefore, it is desirable to set multiplex numbers as priorities irrespective of the command processing multiplex limit number in the ports.

In order to implement this, it is also made possible to set a priority determining command processing multiplex number in the storage apparatus for each world wide name WWN—logical unit LU. As regards a command received in excess of a set value for each world wide name WWN—logical unit LU, the QF status is reported. In this case, when the command issue multiplex numbers set for each world wide name WWN—logical unit LU are set to the storage apparatus, checking against the command processing multiplex limit in the storage apparatus is not conducted.

Figure 12:
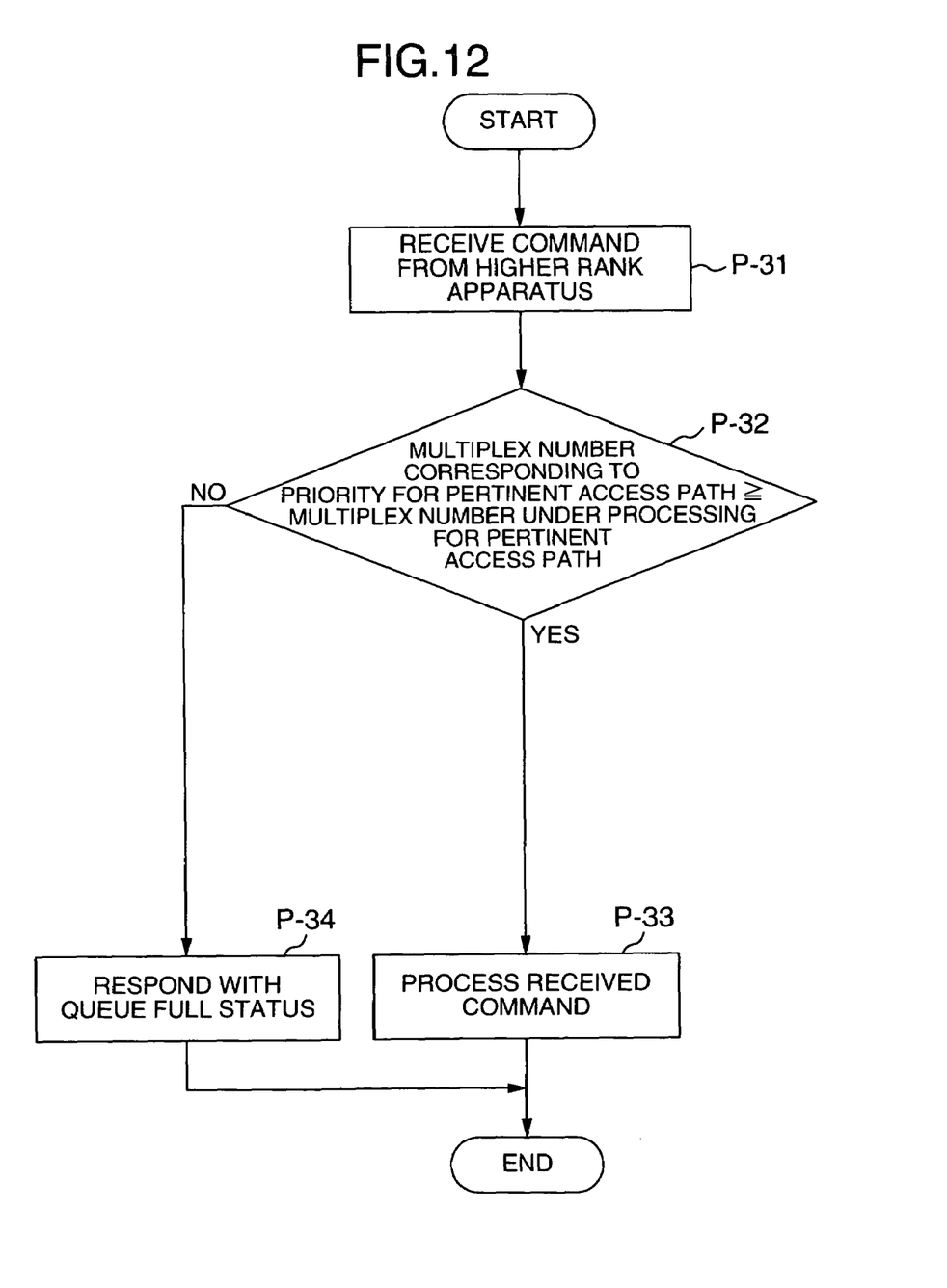
FIG. 12 is a flow diagram showing a processing procedure in a fourth embodiment of the present invention.

FIG. 12 is a flow diagram showing a processing procedure in the fourth embodiment of the present invention. This processing is command processing queue (where the number of queues is the command processing multiplex limit number) operation and command processing conducted when a command is received from a higher rank apparatus. A microprogram in the storage control apparatus SCS executes the processing.

The processing is started, and a command is received from a higher rank apparatus (P-31). The multiplex number corresponding to the priority for the pertinent access path is compared with the multiplex number under processing for the pertinent access path (P-32). If it is found as a result of the comparison that the multiplex number corresponding to the priority for the pertinent access path is greater, or the multiplex number corresponding to the priority for the pertinent access path is equal to the multiplex number under processing for the pertinent access path, then the received command is processed (P-33) and the processing is finished. On the other hand, if the multiplex number under processing for the pertinent access path is greater, or the multiplex number corresponding to the priority for the pertinent access path is equal to the multiplex number under processing for the pertinent access path, then a QF status is sent as a response (P-34), and the processing is finished.

When the storage apparatus is connected to a higher rank apparatus that does not stop command multiplex issue even if the higher rank apparatus has received a QF status, it becomes possible according to the fourth embodiment to provide priority for each world wide name WWN—logical unit LU. When setting access permissions that are not used at the same time, command processing resources can be utilized efficiently.

FIFTH EMBODIMENT

Figure 13:
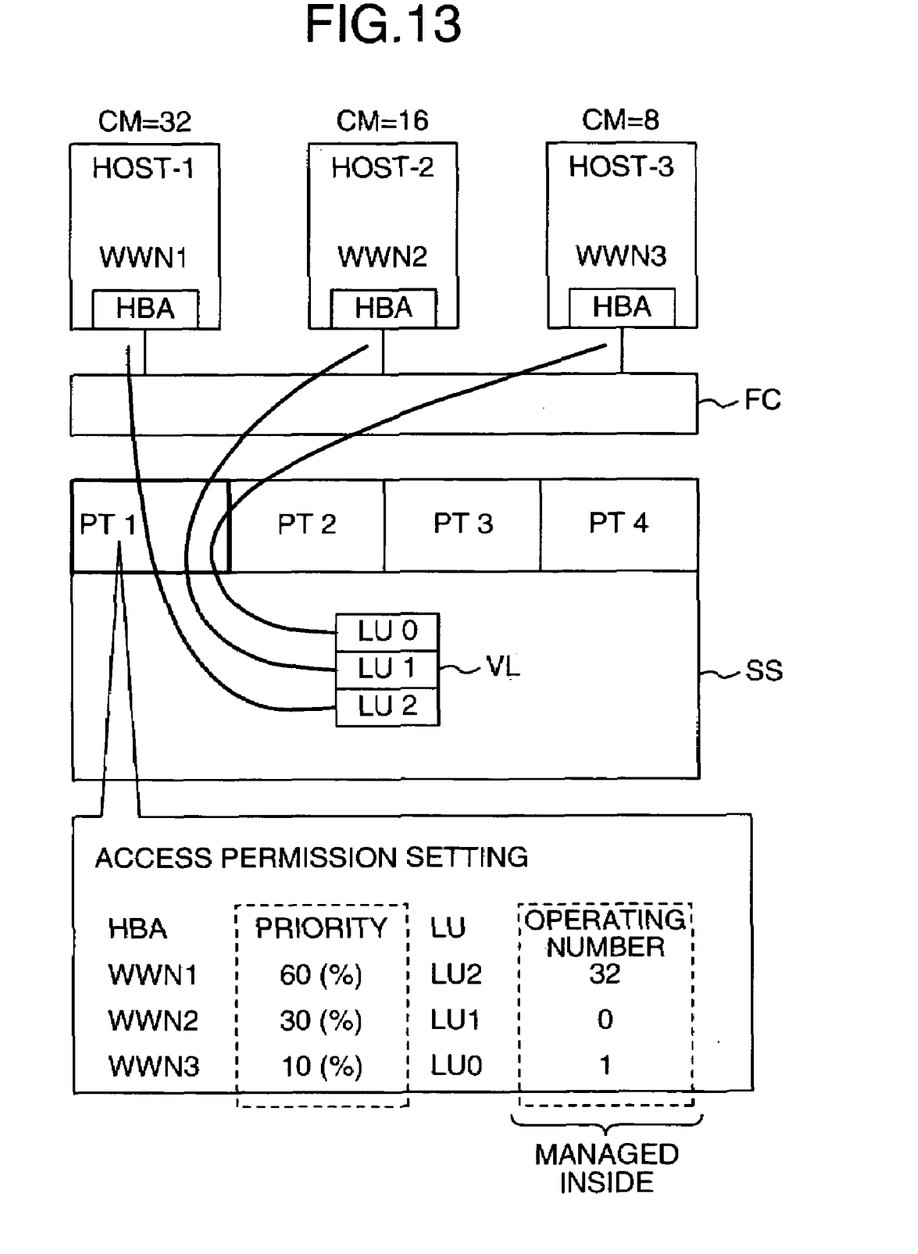
FIG. 13 is a diagram of a computer system showing a fifth embodiment of the present invention.

FIG. 13 is a diagram of a computer system showing a fifth embodiment of the present invention. The fifth embodiment solves the following problem. When the storage apparatus is connected to a higher rank apparatus that does not stop command multiplex issue even if the higher rank apparatus has received a QF status, it is not possible in the configuration shown in FIG. 11 to conduct command processing in excess of the priority according to the operational situation of the higher rank apparatus. In other words, if priorities reset for access permissions, it is impossible in the configuration shown in FIG. 11 to conduct command processing in excess of the set value even if the operational situation of the higher rank apparatus is higher than values set for other higher rank apparatuses.

In the fifth embodiment, the command multiplex situation received for each world wide name WWN—logical unit LU is monitored. If a command exceeding the priority is received and command processing is not present in other world wide names WWNs—logical units LUs, command resources are assigned to the world wide name WWN under operation—logical unit LU.

In other words, operating information for each setting of priority explained with reference to FIG. 11 is managed in ports in the storage control apparatus included in the storage apparatus as shown in FIG. 13, besides the priority setting described with reference to FIG. 11. In FIG. 11, only setting in the port PT1 is shown, but similar setting is conducted for other ports as well.

The operating number to be managed is a command issue multiplex number under processing on each world wide name WWN—logical unit LU. As for the operating numbers under management, in the embodiment, 32 is assigned for the world wide name WWN1—logical unit LU2, 0 for the world wide name WWN2—logical unit LU1, and 1 for the world wide name WWN3—logical unit LU0.

Figure 14:
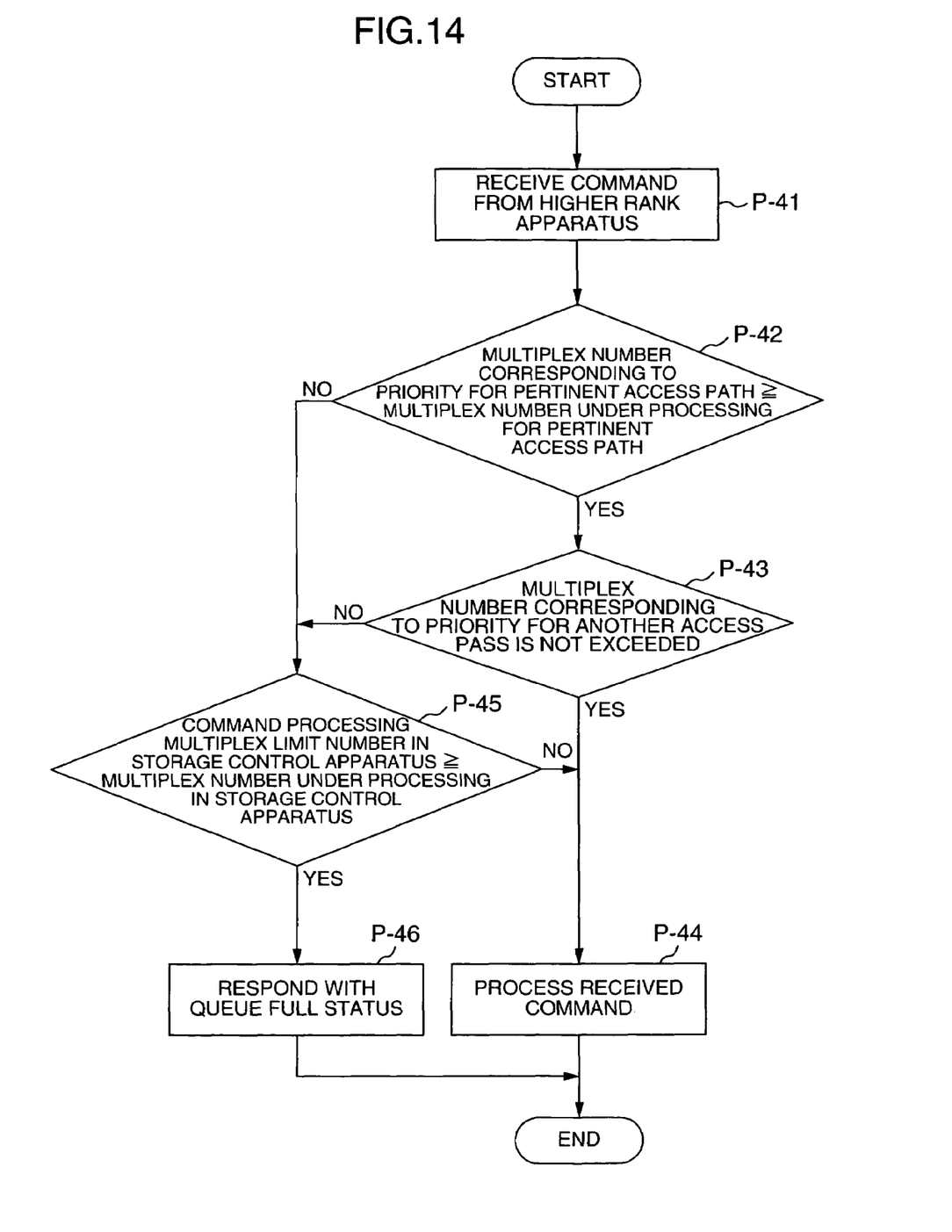
FIG. 14 is a flow diagram showing a processing procedure in a fifth embodiment of the present invention.

FIG. 14 is a flow diagram showing a processing procedure in the fifth embodiment of the present invention. This processing is command processing queue (where the number of queues is the command processing multiplex limit number) operation and command processing conducted when a command is received from a higher rank apparatus. A microprogram in the storage control apparatus SCS executes the processing.

With reference to FIG. 14, the processing is started, and a command is received from a higher rank apparatus (P-41). The multiplex number corresponding to the priority for the pertinent access path is compared with the multiplex number under processing for the pertinent access path (P-42). If it is found as a result of the comparison that the multiplex number corresponding to the priority for the pertinent access path is greater than the multiplex number under processing for the pertinent access path, or the multiplex number corresponding to the priority for the pertinent access path is equal to the multiplex number under processing for the pertinent access path, it is examined whether or not the multiplex number corresponding to the priority on another access path is exceeded (P-43). If it is judged that it is not exceeded in step (P-43), the command receive is processed (P-44) and the processing is finished. On the other hand, if in step (P-42), it is judged that the multiplex number under processing for the pertinent access path is greater, the command processing multiplex limit number in the storage control apparatus is compared with a total of the operating numbers of the storage control apparatus (P-45).

In step (P-45), if the command processing multiplex limit number in the storage control apparatus is greater than the total of the operating numbers of the storage control apparatus, or the command processing multiplex limit number in the storage control apparatus is equal to the total of the operating numbers of the storage control apparatus, a QF status is sent as a response (P-46), and the processing is finished. In step (P-43), when it is judged that the multiplex number corresponding to the priority on another access path is exceeded (P-43), the command receive is processed (P-44) and the processing is finished. In step (P-45), when it is judged that the total of the operating numbers of the storage control apparatus is greater, the command receive is processed (P-44) and the processing is finished.

According to the fifth embodiment, a command for the world wide name WWN—logical unit LU under operation can be processed preferentially according to the operational situation of the higher rank apparatuses connected to the storage apparatus and in excess of the set priority.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A command multiplex number monitoring control scheme in a computer system, the computer system including a storage apparatus and one or more higher rank apparatuses, the storage apparatus including a volume and a storage control apparatus, the volume including one or more logical units, the storage control apparatus including one or more ports, each of the higher rank apparatuses having a world wide name, the higher rank apparatuses being connected to the storage apparatus via a network, comprising:

setting command issue multiplex numbers respectively in the higher rank apparatuses for each access permission information constituted of world wide names of the higher rank apparatuses, each of the higher rank apparatuses issuing commands no more than a respective command issue multiplex number;

setting the logical units corresponding to the world wide names in the storage apparatus in the ports in the storage apparatus; and setting access permission information for which a total of the set command issue multiplex numbers exceeds a command processing multiplex limit number of the storage control apparatus to be rejected as abnormal, wherein a reference instruction whereby the command issue multiplex numbers set in the storage control apparatus can be referenced from the higher rank apparatuses is provided in the higher rank apparatuses, command issue multiplex numbers of the higher rank apparatuses managed in the storage control apparatus are correctly set in the higher rank apparatuses, by referencing the command issue multiplex numbers set in the higher rank apparatuses from a path management program incorporated in each of the higher rank apparatuses, and referencing values of the command issue multiplex numbers from the storage control apparatus, command issue multiplex numbers set in the higher rank apparatuses are correctly set in the storage control apparatus, and a command processing multiplex number that determines priority of command processing is set in the storage control apparatus for each world wide name provided for a higher rank apparatus and a corresponding logical unit in the storage apparatus, and a command full status is reported against a command received in excess of a value set for each world wide name and corresponding logical unit of the storage apparatus, and thereby priority is assigned to each logical unit corresponding to the world wide name without judging abnormal for the setting of access permission information for which a total of the set command issue multiplex numbers exceeds a command processing multiplex limit number of the storage control apparatus.

2. The command multiplex number monitoring control scheme according to claim 1, wherein a command multiplex situation received for each world wide name provided for each higher rank apparatus and the corresponding logical unit in the storage apparatus is monitored, and if a command exceeding the assigned priority is received and command processing is not present in a world wide name provided for another higher rank apparatus and the corresponding logical unit in the storage apparatus, processing resources are assigned to the world wide name provided for the higher rank apparatus under operation and the corresponding logical units in the storage apparatus under operation.

* * * * *